United States Patent
Zamek

(10) Patent No.: US 6,584,565 B1
(45) Date of Patent: *Jun. 24, 2003

(54) METHOD AND APPARATUS FOR LONG TERM VERIFICATION OF DIGITAL SIGNATURES

(75) Inventor: Steven Zamek, Palo Alto, CA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 403 days.

(21) Appl. No.: 08/892,792

(22) Filed: Jul. 15, 1997

(51) Int. Cl.[7] .................................. H04L 9/30
(52) U.S. Cl. .................. 713/156; 713/157; 713/158; 713/178
(58) Field of Search ................. 713/156, 157, 713/158, 178

(56) References Cited

U.S. PATENT DOCUMENTS

| 5,373,561 A | * | 12/1994 | Haber et al. | 380/49 |
| 5,717,758 A | * | 2/1998 | Micall | 380/25 |
| 5,724,027 A | * | 3/1998 | Shipman et al. | |
| 5,781,629 A | * | 7/1998 | Haber et al. | 380/28 |
| 5,960,083 A | * | 9/1999 | Micali | 380/23 |
| 6,151,643 A | * | 11/2000 | Cheng et al. | 710/36 |

FOREIGN PATENT DOCUMENTS

| EP | 0 422 757 A2 | 4/1991 | H04L/9/32 |
| EP | 0 869 636 A2 | 10/1998 | H04L/9/32 |
| WO | WO 92/12485 | 7/1992 | G06F/12/14 |
| WO | WO 97/20411 | 6/1997 | H04L/9/00 |

OTHER PUBLICATIONS

Menezes et al., Handbook of Applied Cryptography, pp. 580–583.
Ford et al., Secure Electronic Commerce pp. 204–205, 248–249, 293–294.
Chokhani, Santosh: "Toward A National Public Key Infrastructure"; IEEE Communications Magazine, Sep. 1994, USA; vol. 32, No. 9, pp. 70–74, XP000476557, ISSN: 0163–6804.

* cited by examiner

Primary Examiner—Gilberto Barron
Assistant Examiner—Douglas Meislahn

(57) ABSTRACT

The time over which a digital signature can be verified is extended well beyond the expiration of any or all of the certificates upon which that signature depends. A "save state" approach is disclosed, in which an archive facility is used to store public key infrastructure (PKI) state, e.g. cryptographic information, such as certificates and certificate revocation lists (CRLs), in addition to non-cryptographic information, such as trust policy statements or the document itself. This information comprises all that is necessary to re-create the signature verification process at a later time. When a user wants to reverify the signature on a document, possibly years later, a long term signature verification (LTSV) server re-creates the precise state of the PKI at the time the document was originally submitted. The LTSV server restores the state, and the signature verification process executes the exact process it performed (or would have performed) years earlier. In another embodiment the strength of cryptography is combined with the proven resilience of (non-public key) technology and procedures currently associated with secure data stores by saving the PKI state for future reverification; and protecting the PKI state information from intrusion by maintaining it in a secure storage facility which is protected by services, such as firewalls, access control mechanisms, audit facilities, intrusion detection facilities, physical isolation, and network isolation.

42 Claims, 5 Drawing Sheets

SCENARIO 1

SCENARIO 2

SCENARIO 3

US 6,584,565 B1

METHOD AND APPARATUS FOR LONG TERM VERIFICATION OF DIGITAL SIGNATURES

BACKGROUND OF THE INVENTION

1. Technical Field

The invention relates to the use of digital signatures. More particularly, the invention relates to a method and apparatus for the long term verification of digital signatures.

2. Description of the Prior Art

The technology of digital signatures opens up the likelihood of increased use of digital networks (including the Internet) for electronic commerce. It is now feasible to send and receive digitally signed documents that represent transactions of some value to one or more parties.

Currently, a digital signature is verifiable only as long as the digital certificates upon which it depends have not expired. Given the expectation that a certificate's life span is in the area of one to two years duration, current technology does not support the emerging needs of the electronic commerce market, where the durability of digital signatures over time is a requirement.

For certain applications, the recipient of digitally signed documents should be able to verify the authenticity of a document years after the document was signed, just as the document's authenticity can be verified at the time of signing. Unfortunately, the current state of the technology does not provide for the verification of these digital signatures after certificate expiration because it is the nature of keys and certificates used for signing and encrypting documents to expire after a specific period of time (typically after a year or two). This is due, at least in part, to the fact that the strength of keys is expected to degrade over time because of such factors as improvements in computing speed and breakthroughs in cryptoanalysis. Moreover, the longer the key is in use, the longer that an adversary has to attempt to crack the key. Therefore, it is standard practice to replace keys periodically. This is why certificates have specific expiration dates.

An examination of the current state of the technology reveals that a digital signature verification module would fail if presented with a request to verify a signed document in which any of the associated certificates had expired. FIG. 1 is a block schematic diagram illustrating certification expiration. This simple example demonstrates that, given a certificate 10 having a two-year life span (e.g. from Apr. 1, 1996 to Apr. 1, 1998), a signature could be successfully verified six months (e.g. on Oct. 1, 1996) after certificate issuance (100); but this same signature would not be successfully verified three years later (e.g. on Apr. 1, 1999) (102). This behavior is clearly unacceptable if the duration of a document, for example contract, must extend beyond the duration of the certificates' life.

Further, some current systems use certificate revocation lists (CRLs) to revoke certificates and remove them therefrom, once those certificates expire. This means that a record of those CRLs generally disappears, making long term signature verification impossible using known techniques.

It is known to reconstruct past trust (see A. Menezes, P. van Oorschot, S. Vanstone, *Handbook of Applied Cryptography*, CRC Press, pp. 583 (1996)). In this approach, both signature reverification relative to a past point in time and resolution of disputes may require reconstruction of chains of trust from a past point in time. This requires archival of keying material and related information for reconstruction of past chains of trust. Direct reconstruction of such past chains is taught to be unnecessary if a notarizing agent is used. A notarizing agent is defined as a general service capable not only of ascertaining the existence of a document at a certain time, but of vouching for the truth of more general statements at certain points in time. The original verification of the notary is taught to establish the existence of a trust chain at that point in time, and subsequently its record thereof is taught to serve as proof of prior validity. It is taught that details of the original trust chain may be recorded for audit purposes. It is not taught that a document can be verified based upon the existence of expired certificates. Rather, reliance is placed upon the use of the notarizing agent. It is further taught that the archived keying material can be used as evidence at a future time to allow resolution of disputed signatures by non-automated procedures.

It would be advantageous to provide a technique for extending the time over which the authenticity and integrity of digital signatures can be accurately verified beyond the time that any relevant certificates expire.

SUMMARY OF THE INVENTION

The invention provides a method and apparatus which effectively extends the time over which a digital signature can be verified, i.e. well beyond the expiration of any or all of the certificates upon which that signature depends. The invention can be used for any application domain where users want digital signatures to be applied to long lasting documents (e.g. contracts), and be independently verifiable years or decades after signing the document. The preferred embodiment of the invention provides two alternative approaches to constructing a solution which delivers long term signature verification (LTSV).

One embodiment of the invention provides an approach for solving the LTSV problem that is referred to herein as the "save state" approach. This embodiment of the invention largely entails the use of cryptographic information and techniques. Thus, an archive facility is used to store the public key infrastructure (PKI) state, e.g. cryptographic information, such as certificates and CRLS, in addition to the document itself. This information comprises all that is necessary to re-create the signature verification process at a later time. It may also be desirable to store the source document separately from the cryptographic information (such as the signature, certificates, and CRLs) for reasons of privacy. For example, a user may want to have control over the source document. The PKI state information may contain either or both of cryptographically protected information, such as certificates and CRLs, and information that is not cryptographically protected, such as the public key of a root certification authority or policy information.

When a user wants to reverify the signature on a document, possibly years later, an LTSV server re-creates the precise state of the PKI at the time the document was originally submitted. The LTSV server restores the state, and the signature verification process executes the exact process it performed (or would have performed) years earlier. The time used as the basis for re-creation of the signature verification process does not have to be the time of submittal. Rather, the time could be some other relevant time, such as when a document was signed by the originator or when it was verified by a recipient.

Another embodiment of the invention combines the strength of cryptography with the proven resilience of (non-public key) technology and procedures currently associated with secure data stores. An example of this embodiment provides a mechanism that:

Saves the PKI state for future reverification; and

Protects the PKI state information from intrusion by either maintaining it in a secure storage facility which is protected by services, such as firewalls, access control mechanisms, audit facilities, intrusion detection facilities, physical isolation, and network isolation; and/or employing a cryptographic protection mechanism, for example using the LTSV server to sign the PKI state information or using a keyed hash algorithm.

In addition, other non-cryptographic features may be added to such approaches to deliver a highly secure and trusted LTSV solution, including, for example utilities for viewing the PKI state information (cryptographic as well as non-cryptographic) and visually monitoring the security of the system. These utilities can be used to provide visual evidence for purposes of dispute resolution.

One enhancement to the secure storage approach herein disclosed maintains certain evidence, such as certificate chains, in an archive. This information need not be used for actual reverification, but merely as supporting evidence in case of a dispute.

BRIEF DESCRIPTION OF THE DRAWINGS

FIG. 4 is a flow diagram that provides two alternative scenarios that illustrate the applicability of time stamps to the invention;

DETAILED DESCRIPTION OF THE INVENTION

Figure 1:
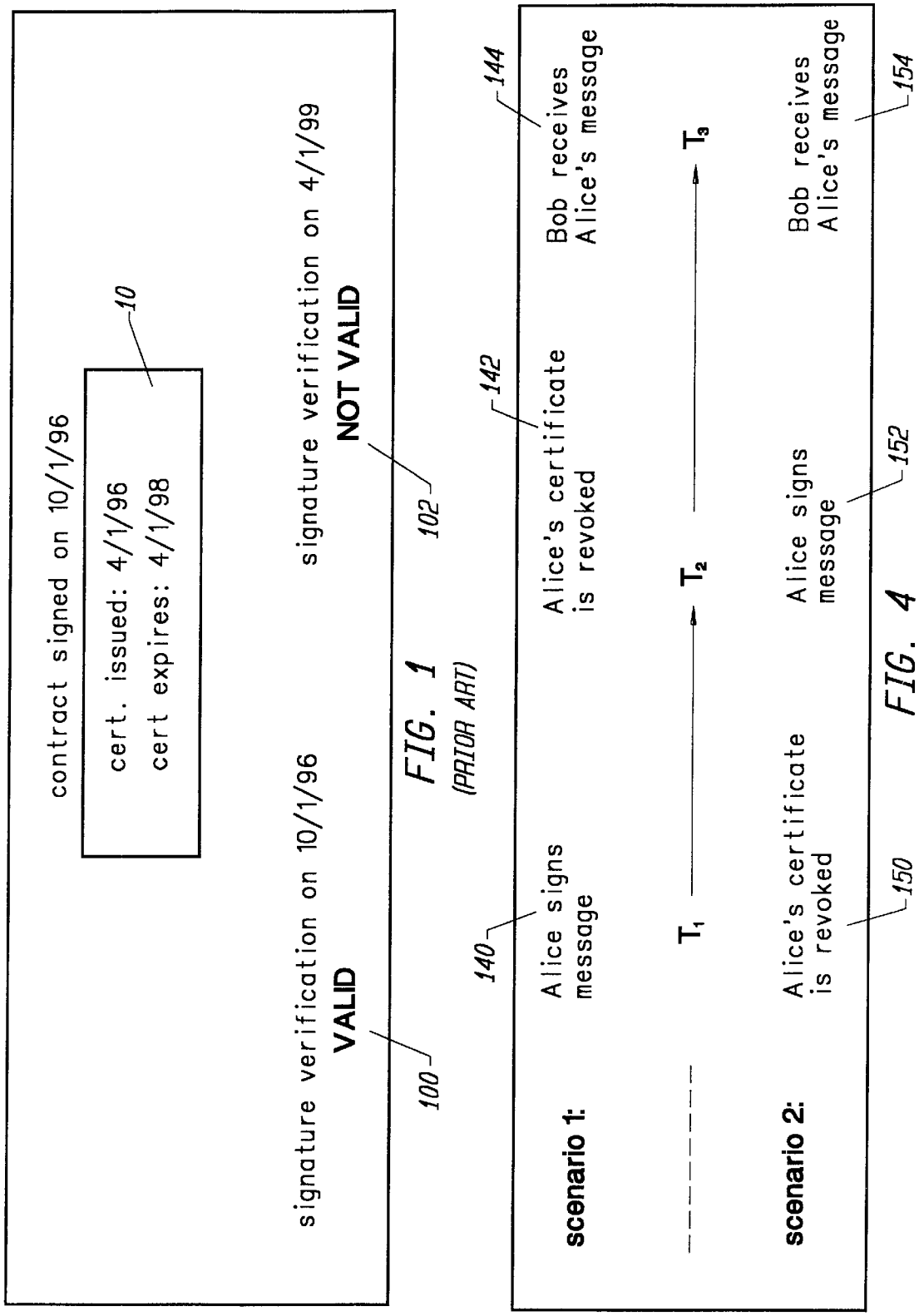
FIG. 1 is a block schematic diagram illustrating certification expiration.

The meanings of some of the terms used herein may differ somewhat from common usage. The following definitions are meant to clarity the meaning of each in the context of its usage herein.

Archive: Any facility for the storage and retrieval of electronic information.

Certificate: An artifact upon which digital signatures are based. A certificate securely binds an entity with that entity's public key.

Cryptographic Refresh: A means of solving the key degradation problem when storing cryptographic information for long periods of time. The process involves re-encoding the old cryptographic artifacts (e.g. encrypted data, digital signatures, and message digests) with stronger algorithms and/or longer keys.

Document: A document can be any information which can be represented electronically or optically (e.g. an arbitrary bit stream).

Key Degradation/Algorithm Degradation: The process whereby the protection afforded a document by encryption under a key loses effectiveness over time. For example, due to factors such as improvements in computing speed and breakthroughs in cryptoanalysis, it is expected that a document securely encrypted today would be crackable years later. This property could affect any cryptographic information, including digital signatures. This problem can be generalized to keyed and non-keyed cryptographic processes and artifacts, such as one-way hash algorithms. The security provided by these are also expected to diminish over time.

LTSV: Long Term Signature Verification. The herein described method and apparatus for verifying a digital signature after the certificates used for such verification have expired.

LTSV client: The entity which requests/utilizes the services of the LTSV server.

LTSV server: The entity which delivers the LTSV services. This does not imply, however, that this entity must be stand-alone component.

LTSV submission: A request from an LTSV client to an LTSV server to perform the necessary functions required to enable reverification of a digital signature some time in the future (e.g. save PKI state).

PKI: Public Key Infrastructure. Refers to all components, protocols, algorithms, and interfaces required to deliver the capabilities to digitally sign and verify documents. For purposes of clarity herein, a PKI does not include a service module for long term signature verification (LTSV server), although in practice a PKI might be designed to encompass such a module.

Signature Reverification: The re-creation of the digital signature verification process after the original verification. This specifically refers to the process associated with the verification process, based upon the restoration of the previously saved PKI state.

Signature Verification: The process by which a digital signature, for a given document, is determined to be authentic or not.

Signature Verification Module: The module which is responsible for performing the verification of digital signatures.

Time stamp: A digital time stamp is an electronic indicator which associates the current date and time with a particular document. Time stamps are useful for proving that a document existed at a particular time. It is desirable that time stamps be secure, durable over time, and trusted by those using them.

The discussion herein assumes an understanding of public key, digital signatures, and PKI infrastructure using X.509 certificates. Practical information concerning application of such techniques is considered to be well known to those skilled in the art. Background information may be found, for example, in B. Schnier, *Applied Cryptography: Protocols, Algorithms, and Source Code in C,* John Wiley & Sons, Inc. (1996); W. Ford, M. Baum, *Secure Electronic Commerce,* Prentice Hall PTR (1997); and in the X.509 v.3 specification ([X.509-AM] ISO/IEC JTC1/SC 21, Draft Amendments DAM 4 to ISO/IEC 9594-2, DAM 2 to ISO/IEC 9594-6, DAM 1 to ISO/IEC 9594-7, and DAM 1 to ISO/IEC 9594-8 on Certificate Extensions, Dec. 1, 1996). The invention described herein may be built upon the X.509 infrastructure.

The following discussion provides some background on cryptographic techniques. Cryptographic algorithms can generally be divided into two categories: public key (e.g. RSA) and secret key (e.g. DES). Both types of algorithms transform plain text into cypher text using a key(s) for the encryption and decryption processes.

Both public key and secret key algorithms are considered to be secure. One is not better than another in terms of security. The strength of each algorithm, in terms of it being cracked, is largely a function of the length of the key used. The primary distinguishing characteristic of public key, however, is that it uses two keys (one to encrypt and another to decrypt), while secret key algorithms use only one key (the same key is used for encryption and decryption). For this reason, secret key algorithms are sometime referred to as symmetric algorithms and public key algorithms are called asymmetric.

One problem with secret key algorithms is that a key must be distributed between all participants. This means that some secure channel must be available for the distribution of the keys.

In practice, each entity in a public key-based system has a key pair, i.e. one private key and one public key. The private key is known only to its owner, the public key is known to all correspondents. It is computationally infeasible to determine a private key from the public key.

The two primary services provided by public key cryptography are secure exchange of symmetric keys (by using public key techniques to encrypt a symmetric session key), and non-repudiation via digital signatures.

Public key cryptography can be used to solve the key exchange problem associated with secret key algorithms by using this technology to encrypt the secret key under the public key of the recipient. It can then be decrypted by the recipient using his/her private key.

Digital signatures are possible by encrypting data with the private key of the signing entity. Any entity can decrypt it with the signer's publicly available public key and know that no one else could have encrypted it because that private key is only known by that one individual. This particular use of public key provides the non-repudiation service, which is a primary use of public key cryptography. A digital signature is very powerful notion, it generally exhibits the following characteristics:

Cannot be forged;

Is independently verifiable;

Is not reusable or transferable to a different piece of data; and

Includes data integrity checks, allowing tamper-detection.

The new services provided by public key cryptography do not come for free, however, because these services require the existence of a supporting public key infrastructure. The strength of a public key system depends upon the assurance that all participants know the public key of any entity with whom they wish to correspond. If a secure correspondence between a user and his/her public key cannot be maintained, then it may be possible to impersonate another entity or read encrypted data intended for another.

The standard solution to this problem is the issuance of a digital certificate (X.509 certificate) to each participant. This certificate securely binds its owner's name with his/her public key. It is issued by a trusted third party, called a certification authority (CA), and is signed by that CA, thereby making it tamper proof. Certificates are issued for a limited period of time (start and stop dates), during which the certificate is considered valid. A certificate is considered expired after the ending validity date.

The public keys of entities (which are embedded in the X.509 certificates) must be publicly available. The distribution or access mechanisms available are numerous.

The secure operation of a public key infrastructure rests upon certain points of trust. Certainly each entity must trust its own CA. However, when a given PKI domain is expanded to encompass relationships with multiple CAs, the number of points of trust are also expanded. The trust placed in a particular end entity (i.e. that entity's certificate or signature) is directly related to the trust relationships among the CAs which certify those entities.

CAs can create trust relationships with other CAs by certifying each other. This can be a unidirectional trust relationship, whereby one CA can merely issues a certificate to another CA, just as a CA issues a certificate to an end user. Two CAs can also mutually agree to trust each other (bidirectional trust relationship) by issuing a cross-certificate—a special form of certificate which contain two individual certificates, one for each direction.

If two entities are in the same CA domain, then there is no concern with respect to CA trust because they both trust the same CA. This is not the case, however, when dealing with the scenario where entities which have been certified by different CAs attempt to conduct a secure transaction. The security of this transaction depends upon the trust between the CAs. More generally, the security provided by the PKI depends upon the trust models embodied in the trust relationships among the various CAs which choose to trust one another. In concrete terms, any change in these trust relationships can cause a signature verification to either succeed or fail.

The invention provides a method and apparatus which effectively extends the time over which a digital signature can be verified, i.e. well beyond the expiration of any or all of the certificates upon which that signature depends. The invention can be used for any application domain where users want digital signatures to be used on long lasting documents (e.g. contracts), and be independently verifiable years or decades after signing the document. The preferred embodiment of the invention provides two alternative approaches to constructing a solution which delivers long term signature verification (LTSV).

Figure 2:
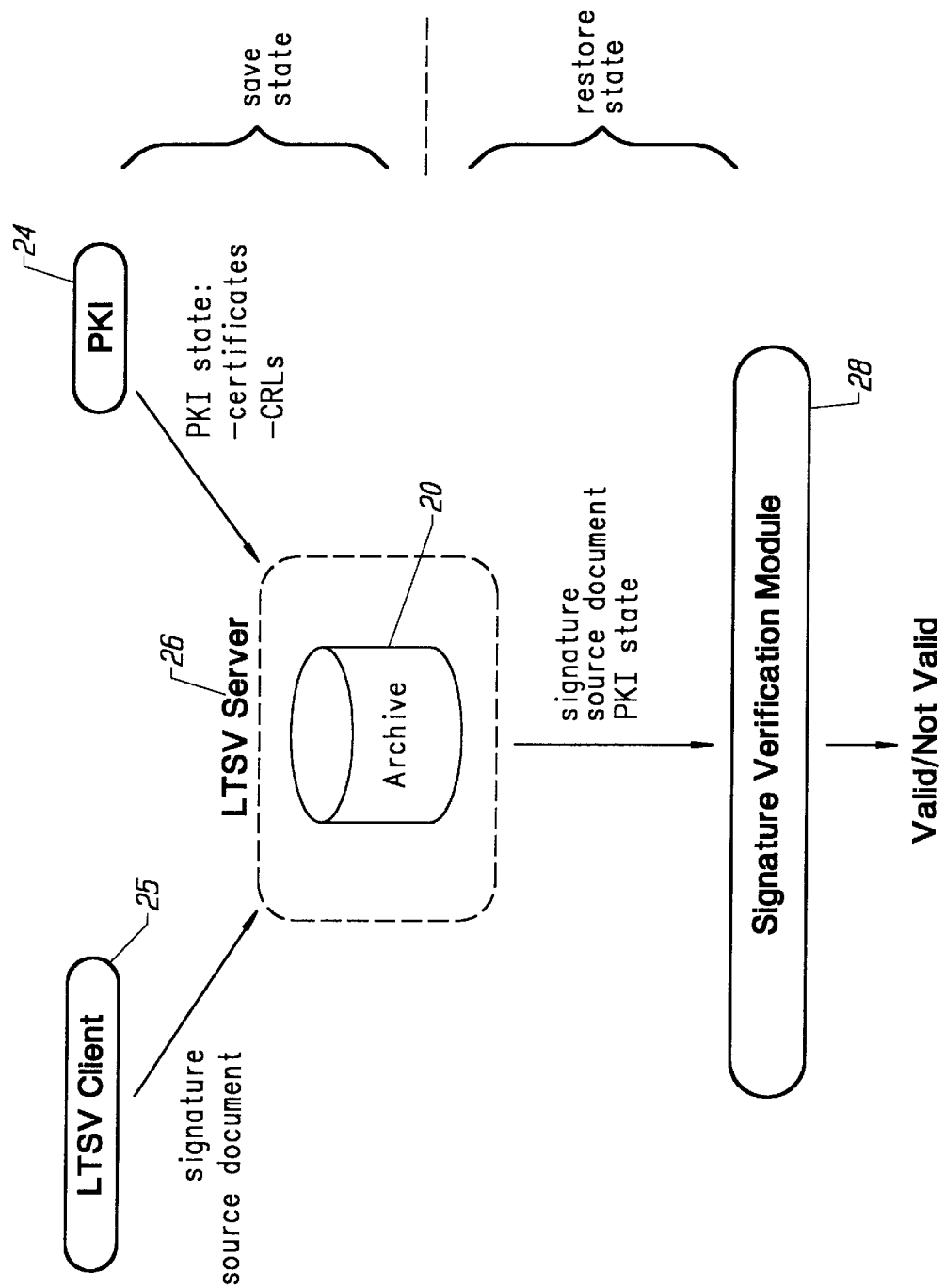
FIG. 2 is a block schematic diagram illustrating a "save state" embodiment of the invention.

FIG. 2 is a block schematic diagram illustrating a "save state" embodiment of the invention. In this embodiment, the invention largely entails the use of cryptographic information and techniques. Thus, an archive facility 20 is used to store a public key infrastructure (PKI) state 24, e.g. cryptographic information, such as certificates and CRLS, in addition to the source document itself. For example, the LTSV client 25 requests the services of an LTSV server 26 to accomplish storage of such information. This step is shown as the "save state" step in FIG. 2. The PKI state information may contain either or both of cryptographically protected information, such as certificates and CRLs, and information that is not cryptographically protected, such as the public key of a root certification authority or policy information.

This information comprises all that is necessary to re-create the signature verification process at a later time, i.e. during the "restore state" step, for example, as requested by the LTSV client. It may also be desirable to store the source document separately from the cryptographic information (such as the signature, certificates, and CRLs) for reasons of privacy. For example, a user may want to have control over the source document.

When a user wants to reverify the signature on a document, possibly years later, the LTSV server 26 re-creates the precise state of the PKI at the time the document was originally submitted. The LTSV server restores the state, and the signature verification process 28 executes the exact process it performed (or would have performed) years earlier. The time used as the basis for re-creation of the signature verification process does not have to be the time of submittal. Rather, the time could be some other relevant time, such as when a document was signed by the originator or when it was verified by a recipient.

Figure 3:
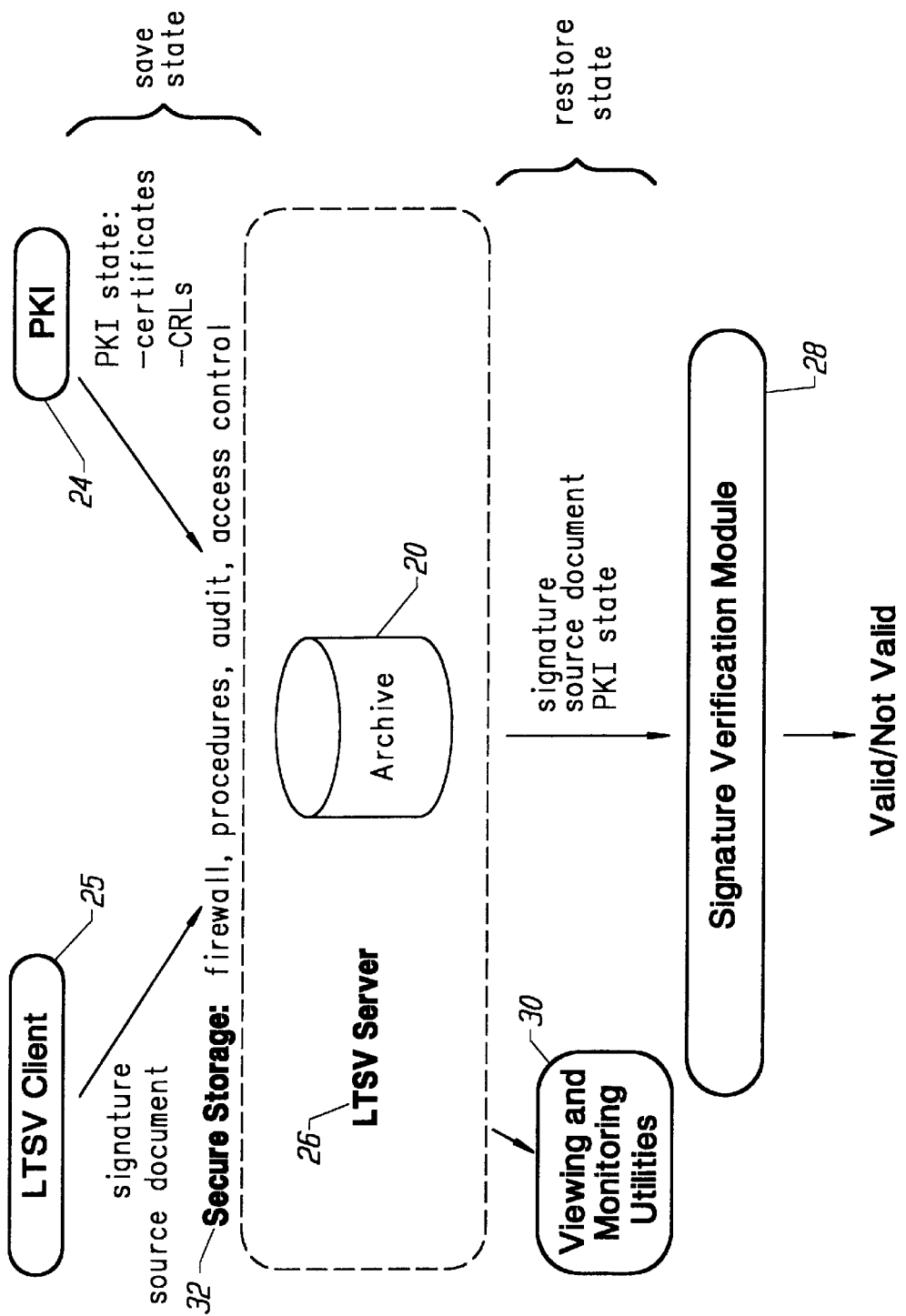
FIG. 3 is a block schematic diagram illustrating a "save state" "secure storage" embodiment of the invention.

FIG. 3 is a block schematic diagram illustrating a "save state" "secure storage" embodiment of the invention. This embodiment of the invention combines the strength of cryptography with the proven resilience of (non-public key) technology and procedures currently associated with secure data stores. An example of this embodiment:

Saves the PKI state for future reverification (as described above in connection with FIG. 2); and Protects the PKI state information from intrusion by maintaining it in a secure storage facility which is protected by services, such as firewalls, access control mechanisms, audit facilities, intrusion detection facilities, physical isolation, and network isolation; and/or employing a cryptographic protection mechanism, for example using the LTSV server to sign the PKI state information or using a keyed hash algorithm.

In addition, other non-cryptographic features may be added to such approach to deliver a highly secure and trusted LTSV solution, including, for example utilities 30 for viewing the PKI state information (cryptographic as well as non-cryptographic) and visually monitoring the security of the system. These utilities can be used to provide visual evidence for purposes of dispute resolution.

One enhancement to the secure storage approach herein disclosed maintains certain evidence, such as certificate chains, in an archive. This information need not be used for actual reverification, but merely as supporting evidence in case of a dispute. See A. Menezes, P. van Oorschot, S. Vanstone, *Handbook of Applied Cryptoaraphy*, CRC Press, pp. 583 (1996), for one manner in which this enhancement may be implemented in the context of a notary service (discussed above).

There are other embodiments of the invention in which a hybrid LTSV solution could be constructed by combining cryptographic and non-cryptographic techniques. The best combination for a particular application domain depends upon the security requirements of the application(s), in combination with cost constraints.

It is presently preferred to employ the second embodiment of the invention (discussed above) due to the cryptographic strength associated with its ability to re-create the complete digital signature verification process, combined with the trust instilled by more conventional techniques used for providing secure storage, and in conjunction with audit and viewing facilities with which to view evidence and monitor the secure storage controls. In practice, the most useful embodiment of the invention for a particular application may be that which is the least expensive and which still meets the user or application requirements.

Several issues related to the design of a system which implements LTSV are described below. Alternatives for the resolution of the issues are presented, as well as a discussion of the advantages and disadvantages associated with each alternative. The best approach to any given solution depends upon the security requirements of the application(s) using the LTSV services, as well as the cost constraints. There is no best solution for all applications.

When to Save the PKI State

Signature reverification is preferably associated with a particular time because the outcome of this process could change, depending upon the state of the PKI (e.g. because of certificate revocations or the creation/removal of cross certificates). There are numerous possibilities with regard to when the PKI state should be saved, including:

At signature creation time. This approach is used when an individual wants to document the validity of his/her signature at the time it was created. This is the most accurate time to store the PKI state because it reflects the state at the time of signing, which is presumably the critical time in evaluating the authenticity of that signature. Changes to the PKI state occur after that time, some of which could impact the outcome of a signature reverification. Therefore, saving of the PKI state at any time after signing introduces the possibility of inconsistencies between the signer's and recipient's perspectives on a signature's validity.

At signature verification time. This approach is useful when a recipient wants to document the validity of a signed document received from another individual.

At archival time. When a user decides that a document should be archived for long term storage is also an appropriate time to save the PKI state.

When explicitly requested. There may occur certain application specific document life cycle milestones, at which time the user may desire the PKI state to be saved for future reverification.

Just before changes in PKI state (e.g. certificate revocation). This approach requires a tight integration with the PKI because changes in the PKI must be monitored.

The correct time at which to save the PKI state is preferably determined by the constraints and needs of the application using the LTSV services. A robust LTSV solution is able to accommodate the needs of all (or most) applications in this respect.

Contents of the PKI State

The exact composition of the PKI state varies somewhat from one PKI vendor's product to another's, depending upon the implementation chosen by each vendor. Moreover, certain information is stored in a different format from one vendor to another. In addition, the contents of a PKI state may change over time as well, as new capabilities (and supporting data) are added to the system. Finally, the required contents of the PKI state may change from one application to another, depending upon the needs (e.g. level of security and legal requirements) of each application.

Notwithstanding these uncertainties, there are classes of PKI state information which are candidates for saving. These classes include:

Certificate chain (list of certificates from one entity to another, including certification authorities (CAs) and the end entities).

CRLs (one for each CA in certificate chain).

CA policy statements or identifiers.

Attribute certificates.

Date and time.

Trust information (e.g., public key(s) or certificate(s) of trusted root CA(s), policy constraints).

Policy constraints are, for example, non-cryptographic information stored within the LTSV archive. The public key of the trusted root CA may or may not be cryptographically protected. If it is embedded in a certificate, then it is signed by the CA. However, it could just as well be an isolated public key, in which case it is unprotected by cryptography.

It is possible that the items in the above list may not be supported or available from certain PKI implementations. Further, the PKI state from another implementation might include some additional data. Therefore, the list above is only an example of what might be considered important pieces of PKI state information, given the current state of the technology. An implementation of an LTSV service is preferably tied to the implementation of a specific PKI until such time as the technology evolves and comprehensive standards emerge.

How to Store the PKI State

Storage of the PKI state is preferably accomplished in either of two general ways:

Store all of the PKI state relevant to each document separately; and

Store the PKI state centrally, and only store references to the PKI state information with each document. This approach enables storage efficiencies by eliminating the redundant storage of PKI state information over multiple documents. For example, given two documents submitted to the LTSV server at about the same time, it is possible that the CRLs contained in the PKI state are exactly the same for both submissions. Central storage of this information allows the LTSV server to store this information only once.

The storage requirements for the save state solution for LTSV may be quite large, depending upon the size of the certificates, the length of the certificate chains and—more importantly—the size of the CRLs. The choice of storage technique may have a great impact on the total data storage requirements. It is clearly undesirable to store massive CRLs with every document that is stored for long term archival and possible future reverification. For this reason, the second alternative listed above is presently considered to be the preferred approach.

However, this second approach may present certain difficulties in applications where the LTSV server is an entirely separate component from the PKI, and where support of multiple PKIs is a primary design goal of the LTSV server. In this case, it would be advantageous for the PKI state to remain opaque to the LTSV server, thereby providing ease of support of multiple PKI vendors. Given that what constitutes the PKI state for one vendor may be different for another vendor, it is desirable to maintain an opaque interface between the LTSV server and the PKI. On the other hand, storage efficiencies can be derived only if the LTSV server is informed about the contents and format of the PKI state information. These conflicting requirements—acceptable storage size and opaqueness—pose a challenge for the design of an LTSV service.

Some of the possible alternatives are listed below:

Keep the interface opaque and store the PKI state as it currently exists (full certificate chains and CRLs). This option focuses entirely on the opaqueness requirement, and sacrifices the data size requirement. The primary advantage of this solution is simplicity and quick deployment.

Remove the opaqueness requirement by making the PKI state visible to the LTSV server. This allows the LTSV server to manage the certificates and CRLs manually—thereby avoiding duplication of these objects in the data store. This solution potentially sacrifices the ease of multi-vendor support at the expense of achieving efficient storage.

Compromise by making the CRLs visible to the LTSV server, where other PKI state information is opaque. This solution is interesting because it is probable that the CRLs are the largest piece of data comprising the PKI state. Because CRLs are standard across nearly all PKIs, the visibility should not pose a problem in terms of multi-vendor support. This solution address both of the requirements, but does put the burden of management of the CRLs onto the LTSV server.

An alternative embodiment of the invention provides a variation on the solution above that breaks up the PKI state into multiple pieces, each of which is opaque. The PKI indicates which of these objects is common across multiple signed documents (e.g. CRLs and certificates). The PKI labels these objects with unique handles (identifiers), thereby allowing the LTSV server to store these objects and retrieve them efficiently when needed for signature reverification—all the while maintaining the opaqueness of these objects.

Encourage PKI vendors to make concise cryptographically protected assertions about the state of revocation, as an alternative to using CRLs. (For example, CRLs indicate who has been revoked. It would be more efficient if the PKI could make a statement that a certificate has not been revoked at a given point in time. This could eliminate the need for storing CRLs.) This approach is non-standard, but acceptable because these PKI-generated assertions are not seen by any application outside the PKI. A major benefit of this approach is that the opaqueness of the state is preserved while some of the storage inefficiencies of the state information are removed.

For cases where the LTSV server is dedicated to a particular PKI, it is preferred to create a close integration between the two components, thereby allowing the LTSV server to know about the content and format of the PKI state information, and store it in the most efficient manner possible. For cases where the LTSV server must be insulated from the PKI (e.g. for portability across multiple PKIs), one of the options listed above (with the possible exception of the first two) may be used.

Location of Source Data

The source data associated with an LTSV submission can be stored either by the client or by the LTSV server itself. Some LTSV clients do not choose to submit clear text to the LTSV server for storage because of concerns over privacy. (Privacy of the channel between the LTSV client and the LTSV server can be achieved by having the client encrypt the submission under the public key of the LTSV server.) A submission to the LTSV may be encrypted, such that the LTSV is not able to decrypt it. That is acceptable with the LTSV server. However, the client must determine how to decrypt the submission.

Given that the LTSV server views the source data as a bit stream, it is possible that the message could be encrypted by the LTSV client before submission. (The fact that a general purpose LTSV server treats the source document as a bit stream does not preclude the possibility of implementing an application specific LTSV server that is aware of the contents of the submitted data.) The LTSV server treats the encrypted data as the source. Such prior encoding may be sufficient for some applications' needs for privacy. In this case, however, either the client must maintain the decryption key, or the key must be divulged and stored by the LTSV server (which is probably not acceptable).

Alternatively, the LTSV client may submit a message digest (resulting from a one-way hash function) as the source document. The client, in this case, is responsible for maintaining the real source document. If the source document is stored by the client, then only the PKI state information is stored in the LTSV server's archive (along with some reference to the source document or the submitter).

Whether the source data is stored by the client or the LTSV server, it must be produced if and when a reverification of that document is required. It is a required component of any signature verification process.

Key and Algorithm Degradation

If cryptographically encoded information (e.g. digital signatures or encrypted data) is stored for a significant period of time, the issue of key and algorithm degradation must be addressed, i.e. the probable loss in effectiveness of a cryptographic key or algorithm over time. Although signed documents are expected to be sealed securely with strong cryptographic algorithms, the strength of an algorithm and associated key length decreases over time with the advent of faster computers and new developments in cryptoanalysis. It is expected that cryptographic algorithms and key lengths have limited life spans. It is generally acknowledged that they should be examined, modified, and/or replaced at periodic intervals. This legitimate security concern increases with the length of time for which a document is valid, and it becomes a very serious threat as the time span approaches multiple decades.

For example, a digital signature performed today, using RSA and a 512-bit key, is considered very strong (i.e. it would take years to forge it). But, it is also expected that this same signature may be easily forgeable within ten years or so. This is because of the increased ability to search the key space faster (and thereby find the key used to sign the message) with newer computers or computing techniques. Similarly, there may continue to be developments in techniques for factoring large prime numbers (the difficulty of which is the basis for the strength of the RSA algorithm). It is reasonable for both of these abilities to improve over time (although the pace of these changes is less certain).

It is, therefore, prudent to protect cryptographically encoded documents from this threat when those documents must live beyond a few years. This is the case with the documents expected to be submitted to the LTSV server, and especially so when using the save state approach herein disclosed. Hence, the LTSV facility should address this problem. Not only must the signed documents stored in the archive be protected from this threat, but all other cryptographic data or meta-data stored in the archive should be protected. (The cryptographic data primarily include keyed information. That is, any information that is signed or encrypted with a private key. Such information may also include non-keyed cryptographic data, such as the output from a hash algorithm, such as MD5.) This data could also include such items as certificates and CRLs, which are, themselves, digitally signed by the issuing CA.

There are any number of ways that the LTSV facility addresses this problem. For example:

Periodically countersign all data in need of cryptographic refresh through the use of nested signatures. Under this approach, the LTSV server effectively refreshes the cryptographic strength of the data by signing it with successively longer keys (or stronger algorithms) every few years. Each counter signature has the effect of locking in the cryptographic strength of the enclosed signature(s), thereby extending the cryptographic life of the enclosed document. This countersignature is preferably performed by the LTSV server using a key owned by that server. Performance shortcuts may be required to avoid the costly unraveling of signatures at reverification time, or the potentially time consuming task of countersigning every document in the archive. Such shortcuts include, for example, removing a previous countersignature before applying a new one, or countersigning the entire archive or portions thereof instead of each individual document.

A modification of the cryptographic approach suggested above provides for countersigning the information in the archive once, but with an extremely long key, i.e. a key which is expected to be unbreakable for decades or more. This eliminates all need for countersigning. This may be merely a theoretical solution because finding an algorithm and key length which is secure for that long is impossible to predict. Therefore, there is still a need to provide some backup mechanism, just in case the original algorithm were cracked, for example.

Protect the cryptographic information in the archive by insulating the archive itself, rather than the individual documents contained in the archive, thereby eliminating the need for a cryptographic solution. In this approach, the archive is protected via access controls and other procedural controls. If the archive can be effectively insulated from intrusion and modification, then key degradation is not an issue and cryptographic refresh is not necessary.

Use a time stamp facility to seal the cryptographic information in time. Such a facility is expected to provide all of the necessary characteristics required for solving the key degradation problem. This time stamp facility could use one of the techniques listed above, or it could even be an independent service (see below for a discussion of time stamping).

Relationship to Time Stamping

A secure and comprehensive LTSV solution preferably includes an association with a time stamping mechanism. For long term verification of digital signatures, it is often necessary to know the time at which particular events occurred (e.g. time of signing or verifying a signature) to determine if a document was valid at that specific time. If there were uncertainty concerning when a document was signed, then the later reverification of that document could be compromised because of the uncertainty of when it was signed.

FIG. 4 is a flow diagram that provides two alternative scenarios that illustrate the applicability of time stamps to the invention.

In scenario 1:

Alice signs a document at time T1, and sends it to Bob (140).

Alice's certificate is revoked at time T2 (142).

Bob verifies Alice's signature at time T3 (144).

In scenario 2:

Alice's certificate is revoked at time T1 (150).

Alice signs a document at time T2, and sends it to Bob (152).

Bob verifies Alice's signature at time T3 (154).

When Bob performs the verification (at time T3), he does not know when Alice signed the document. This is critical, because if Alice's key (certificate) were revoked before signing the message, then the signature verification by Bob should fail, and Bob should not trust the contents of the message. If, on the other hand, the revocation occurred after the act of signing, then the signature can be presumed to be valid and trustworthy. For simplicity, this example does not consider the complicating issue of CRL latency, i.e. the time between the initiation of certificate revocation and the time when this information becomes available on a CRL.

This example demonstrates the need for a secure and trusted time stamp mechanism in the domain of digital signatures. The mere recording of the current date and time when creating a digital signature is not sufficient for most application because the source of that time may not be trusted by the recipient. The impact, however, also applies not only to the short term signature verification process, but also to the long term verification of digital signatures. Given the example above, the LTSV server could save the PKI state (at time T1) associated with scenario 1 or scenario 2 (or both). The outcome of a signature verification on this message years later is greatly affected by the PKI state used for this verification process, as well as the target time for the verification.

The problem highlighted above demonstrates the preference that the LTSV service to be cognizant of time. It should:

Be able to determine in a secure fashion the time at which a document was originally signed;

Be able to re-create accurately the PKI state which was active at a target time in the past;

Be able to determine the current date and time accurately; and

At a minimum, save the PKI state associated with a particular target time.

These requirements establish the preference for the integration of a time stamp facility with the signing and verification (and reverification) process. When a document is signed, it is also preferably time stamped to document in a secure fashion the precise moment at which that event occurred. The LTSV service should know the time for which the PKI state is to be saved, be sure to save the appropriate state (the state active at the target time), and execute its signature reverification process in the context of the correct time.

Usage Scenarios

Figure 5A:
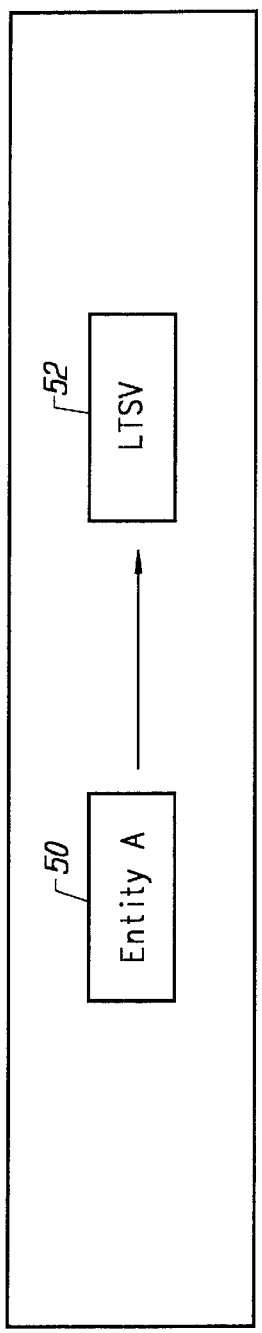
FIGS. 5a–5c provide block schematic diagrams that illustrate three long term signature verification usage scenarios according to the invention.
Figure 5B:
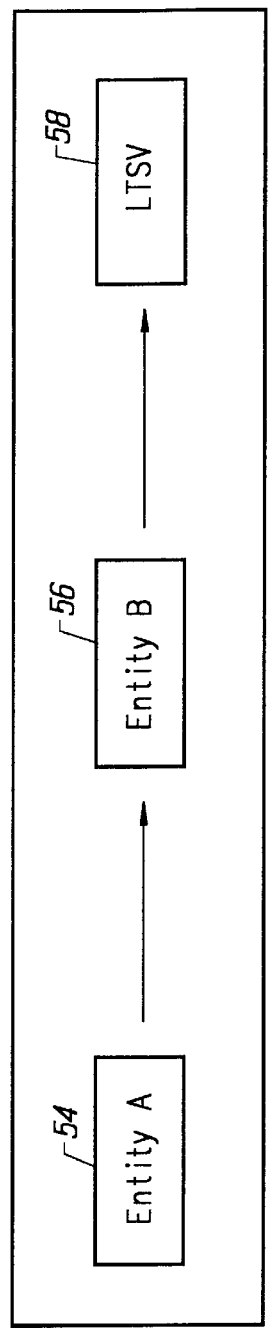
Figure 5C:
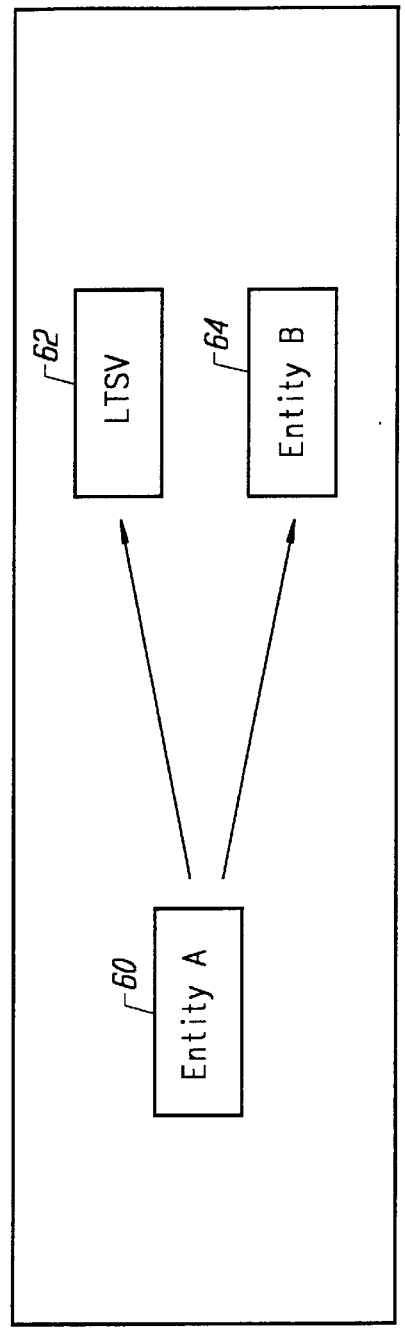

FIGS. 5a–5c provide block schematic diagrams that illustrate three long term signature verification usage scenarios according to the invention.

In scenario 1, a client (EntityA) 50 submits a document to a LTSV facility 52 for long term signature verification. This is a simple case where EntityA is interested in documenting that it possessed some piece of information.

In scenario 2, EntityB 56 receives a document from EntityA 54 and submits that document to the LTSV facility 58. In this case, EntityB wants to document that it received some information from EntityB.

In scenario 3, EntityA 60 sends the same document to EntityB 64 and to the LTSV facility 62. This case represents a carbon copy feature, whereby EntityA can document the information it sent to EntityB by additionally filing it with the LTSV facility.

Each of the scenarios described above raises issues with respect to encryption, private key access, and trust models.

Encryption and Private Key Access

A document can be encrypted and/or signed. Ideally, the LTSV facility accepts any such document. This raises a problem, however, with respect to how the LTSV module works with respect to the encryption. When encrypting under a public key system, the document is effectively encrypted under the public key of the recipient, thereby guaranteeing that the recipient (the possessor of the corresponding private key) is the only entity which can decrypt the information. (For purposes of this discussion, interaction with symmetric keys and algorithms is ignored.)

When applying this principle to scenario 1, it is clear that if the signed message is also encrypted, then it could be encrypted under the public key of the LTSV module. This allows the LTSV component to unwrap the signed document and preserve it for long term verification. This is a useful feature because it provides confidentiality between EntityA and the LTSV service. This scenario does not preclude the possibility that the source document sent signed and encrypted to the LTSV module could itself be encrypted under a key known only to EntityA. That is, it is not necessary that the LTSV have access to the plain text version of the source document. The LTSV module treats that encrypted document as the source. If EntityA does decide to encrypt the document first under a secret key before submitting the document to the LTSV service, then it is the responsibility of EntityA to maintain possession of that key if and when decryption of that document is required.

In Scenario 2, if the message from EntityA to EntityB is encrypted (under the public key of EntityB) and then forwarded—unchanged—to the LTSV service by EntityB, then it is unreadable by the LTSV component because it does not possess the private key required to decipher and unwrap the enclosed signed document. This unwrapping (decipherment) is essential for the LTSV module to do its job.

There exist several alternatives for addressing this problem:

Allow the LTSV facility to have access to EntityB's private key;

Do not allow EntityA to send encrypted documents to EntityB; or

Have EntityB strip off the privacy aspect of the signed and encrypted document received from EntityA. Because EntityB wants to preserve EntityA's signature on the document, and be able to verify it at a later time, this stripping process can not alter the validity of the signature. EntityA can then either send the stripped (i.e. plain text) document to the LTSV service, or it can re-encrypt it (still preserving the original signature by EntityA) under the public key of the LTSV module.

The latter approach above is presently the preferred approach. The first approach above raises significant security concerns because it requires distribution of an entity's private key. The second approach above is unacceptably restrictive on the usage of the system.

Trust

Digital signature verification is always performed between two (and only two) entities. The verification process is based upon (among other things) the trust relationship(s) in place between those two entities—the originator (signer) and the recipient (verifier).

Figure 6:
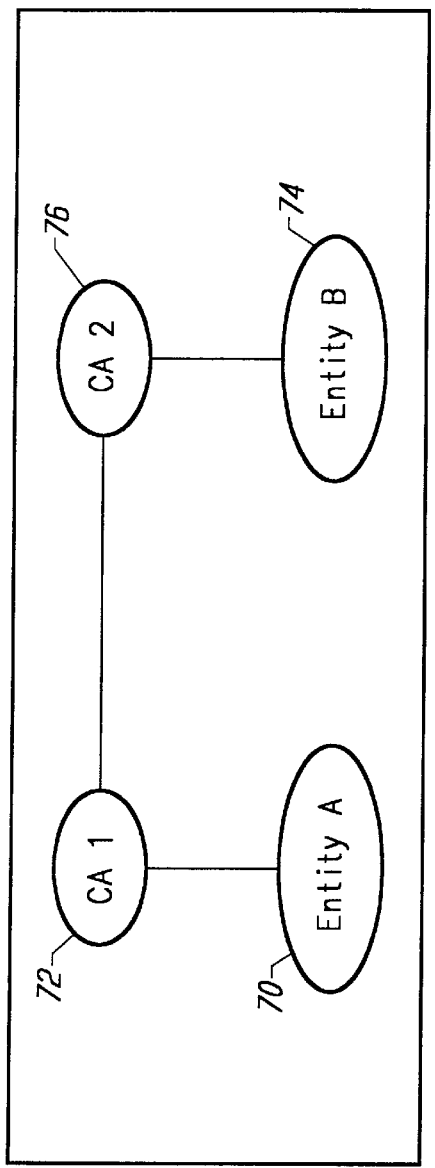
FIG. 6 is a block schematic diagram that illustrates trust between two entities according to the invention.

FIG. 6 is a block schematic diagram that illustrates trust between two entities according to the invention. In this situation, EntityA 70 has been issued a certificate by CA1 72, EntityB 74 has been issues a certificate by CA2 76, and CA's 1 and 2 have been cross certified. (A cross-certificate is a special type of certificate which indicates mutual trust between two CAs.) The resulting trust model sets up a path of trust between EntityA and EntityB, enabling them to verify digitally signed documents from one another successfully. (A trust model is comprised of the trust relationships among PKI entities (CAs and end users), embodied by the certificates and cross-certificates issues among these entities, as well as the underlying policies which enable this trust.) Note that if any of the three paths in this model were not in place, then sufficient trust would be lacking for the successful exchange of digitally signed messages between the two end parties. Signature verification would fail if any entity in this path is not trusted.

This trust path is commonly referred to as the certificate chain because it is composed of the certificates between the two entities. When considering the save state approach to long term signature verification, it is this entire trust path (among other things) which must be archived as part of the PKI state for later signature reverification. Moreover, the trust path stored by the LTSV facility must contain the relevant trust information existing at the time of the request, not at some other time (before or after) where the trust relationships may be different between the entities. For example, a cross certificate between to CAs could either be created or removed at some point in time. This could effect the trust between two entities and affect the outcome of a signature verification.

As discussed above, the time associated with the existing trust model between two entities is extremely important to the LTSV facility, but there are also ramifications with respect to how the LTSV module works—specifically, what trust information is needed and stored by the LTSV component for later signature verification. This gets complicated when the LTSV component is included, which may or may not be trusted (via some trust path) by some entities.

Consider the three scenarios illustrated in FIGS. 5a–5c:

Scenario 1 is fairly straightforward. There are only two entities involved. The trust path stored by the LTSV facility is the path between those two parties (EntityA and LTSV). It is assumed that trust exists between these entities, otherwise EntityA would not submit a request to that service.

Scenario 2, however, raises certain issues. When EntityB sends a request to the LTSV service, what signature does EntityB want to later verify? Most likely, EntityB wants to reverify EntityA's signature at a later time—it wants the LTSV service to document that the signed document received from EntityA was valid (contained a valid signature) at the time it was received. This raises two general questions:

Whether the LTSV service is trusted by EntityA. It can be assumed that the communicating parties (EntityA with EntityB, and EntityB with the LTSV) have developed some trust between themselves. But in this case, it is possible that there exists no trust path between EntityA and the LTSV component.

The trust path that is to be stored by the LTSV facility. There exist three possible trust paths which can be stored by the LTSV, i.e. the path between Entities A and B; the path between EntityB and the LTSV component itself; and the path between EntityA and the LTSV component, if it exists.

Figure 7:
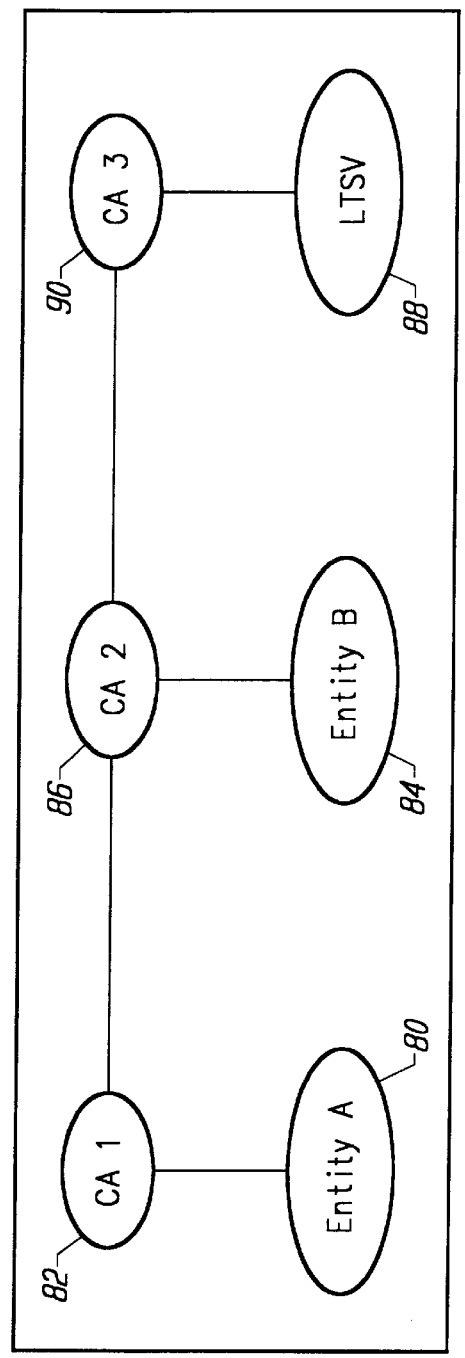
FIG. 7 is a block schematic diagram that illustrates a long term signature verification trust model according to the invention.

FIG. 7 is a block schematic diagram that illustrates a long term signature verification trust model according to the invention. Given scenario 2, where EntityB 84 submits a signed document, received from EntityA 80, to the LTSV component 88, the LTSV can save the trust model embodied in the original signed document (EntityA 80→CA1 82→CA2 86→EntityB 84). Later verification of this signature recreates the verification process originally performed by EntityB when it received this document from EntityA. If, however, the PKI state stored by the LTSV service were to contain only the trust path between the submitter and the service (EntityB 84→CA2 86→CA3 90→LTSV 88), then reverification of the original document, as originally performed, is impossible. In fact, this is exactly the paradigm described in scenario 1, where the trust path between the submitter and the LTSV are of interest.

The above discussion reveals that there are good reasons for the LTSV component to be able to store either trust path, depending upon the requirements of the client.

In scenario 2, the LTSV would most likely store the trust path corresponding to the message from EntityA to EntityB (to reverify the signed document from EntityA to EntityB). In scenario 1, the LTSV would store the trust path corresponding to the submission itself—from EntityA to the LTSV.

Similarly, scenario 3 represents a case where flexibility in which trust path(s) to store is required. In this case, EntityA's submission to the LTSV facility may be with the intent to either reverify its correspondence with EntityB, or to reverify the submission itself (between EntityA and the LTSV). In fact, both trust paths may be of use to the client. The requirements on the LTSV are determined by the business of the particular application being deployed. For this reason, the interface to the LTSV preferably supports the ability of the client to indicate the needs in terms of trust paths as it impacts the requirements for later reverification.

Although the invention is described herein with reference to the preferred embodiment, one skilled in the art will readily appreciate that other applications may be substituted for those set forth herein without departing from the spirit and scope of the invention. Accordingly, the invention should only be limited by the Claims included below.

What is claimed is:

1. A method for enabling long term verification of digital signatures, comprising the steps of:

submitting a source document or digest thereof to a signature verification entity;

using a long term signature verification server to store a public key infrastructure (PKI) state necessary to re-create a signature verification process at a later time relative to said document at a selected archival time, wherein classes of PKI state information may include one or more of:

certificate chain from one entity to another, including certification authorities (CAs) and the end entities; certificate revocation lists (CRLs), one for each CA in certificate chain; certificate practice statements; attribute certificates; policy constraints; trust information; and date and time;

using said archived PKI state in said long term signature verification server to precisely re-create said PKI state to execute exactly said signature verification process as it was or would have been performed earlier relative to said document at a selected time after a certificate associated with said signature has expired;

wherein the time over which a digital signature associated with said document can be verified is extended beyond expiration of any or all of any certificates upon which that signature depends; and wherein the selected archival time used as the basis for subsequent re-creation of a signature verification process is the time when said source document was signed by its originator.

2. The method of claim 1, further comprising the step of: protecting said PKI state information from intrusion by maintaining it in a secure storage facility.

3. The method of claim 2, wherein said secure storage facility comprises at least one of a firewall, access control mechanism, audit facility, intrusion detection facility, physical isolation, and network isolation.

4. The method of claim 1, further comprising the step of: protecting non-cryptographic PKI state information from intrusion by protecting it in an archive via any of a signature and a keyed hash algorithm.

5. The method of claim 1, further comprising the step of: providing utilities for viewing said PKI state information and for visually monitoring system security.

6. The method of claim 1, further comprising the step of:

maintaining selected document related evidence in an archive.

7. The method of claim 5, further comprising the step of:

periodically countersigning all data in need of cryptographic refresh through the use of nested signatures.

8. The method of claim 1, further comprising the step of:

countersigning information in said archive facility once with an extremely long key.

9. The method of claim 1, further comprising at least one of the following two steps:

protecting said archive facility itself, rather than individual documents contained in said archive; and employing a cryptographic protection mechanism at said signature verification entity.

10. The method of claim 1, further comprising the step of:

using a time stamp facility to seal cryptographic information in time.

11. The method of claim 5, further comprising the step of:

storing said source document separately from any associated cryptographic information.

12. A method for enabling long term verification of digital signatures, comprising the steps of:

submitting a source document or digest thereof to a signature verification entity;

using a long term signature verification server to store a public key infrastructure (PKI) state necessary to re-create a signature verification process at a later time relative to said document at a selected archival time, wherein classes of PKI state information may include one or more of:

certificate chain from one entity to another, including certification authorities (CAs) and the end entities; certificate revocation lists (CRLs), one for each CA in certificate chain; certificate practice statements; attribute certificates; policy constraints; trust information; and date and time;

using said archived PKI state in said long term signature verification server to precisely re-create said PKI state to execute exactly said signature verification process as it was or would have been performed earlier relative to said document at a selected time after a certificate associated with said signature has expired;

wherein the time over which a digital signature associated with said document can be verified is extended beyond expiration of any or all of any certificates upon which that signature depends; and wherein the selected archival time used as the basis for subsequent re-creation of a signature verification process is the time when said source document was verified by a recipient.

13. The method of claim 12, further comprising the step of:

storing said source document separately from any associated cryptographic information.

14. The method of claim 12, further comprising the step of:

protecting said PKI state information from intrusion by maintaining it in a secure storage facility.

15. The method of claim 12, further comprising the step of:

protecting non-cryptographic PKI state information from intrusion by protecting it in an archive via any of a signature and a keyed hash algorithm.

16. The method of claim 12, further comprising the step of:

providing utilities for viewing said PKI state information and for visually monitoring system security.

17. The method of claim 12, further comprising the step of:

maintaining selected document related evidence in an archive.

18. The method of claim 12, further comprising the step of:

periodically countersigning all data in need of cryptographic refresh through the use of nested signatures.

19. The method of claim 12, further comprising the step of:

countersigning information in said archive facility once with an extremely long key.

20. The method of claim 12, further comprising at least one of the following two steps:

protecting said archive facility itself, rather than individual documents contained in said archive; and employing a cryptographic protection mechanism at said signature verification entity.

21. The method of claim 12, further comprising the step of:

using a time stamp facility to seal cryptographic information in time.

22. An apparatus for long term verification of digital signatures, comprising:

a source document; and a long term signature verification server for storing a public key infrastructure (PKI) state necessary to re-create a signature verification process at a later time relative to said document at a selected archival time, wherein classes of PKI state information may include:

one or more of certificate chain from one entity to another, including certification authorities (CAs) and the end entities; certificate revocation lists (CRLs), one for each CA in certificate chain; certificate practice statements; attribute certificates; policy constraints; trust information; and date and time;

wherein said archived PKI state in said long term signature verification server is used to precisely re-create said PKI state to execute exactly said signature verification process as it was or would have been performed earlier relative to said document at a selected time after a certificate associated with said signature has expired;

wherein the selected time over which a digital signature associated with said document can be verified is extended beyond expiration of any or all of any certificates upon which that signature depends; and wherein the time used as the basis for subsequent re-creation of a signature verification process is the time when said source document was verified by a recipient.

23. The apparatus of claim 22, further comprising:

a facility for storing said source document separately from any associated cryptographic information.

24. The apparatus of claim 22, further comprising:

a secure storage facility in which said PKI state information is maintained to protect it from intrusion.

25. The apparatus of claim 22, further comprising:

one or more utilities for any of viewing said PKI state information and visually monitoring system security.

26. The apparatus of claim 22, wherein selected document related evidence is maintained in an archive.

27. The apparatus of claim 22, wherein all data in need of cryptographic refresh is periodically countersigned through the use of nested signatures.

28. The apparatus of claim 22, wherein information in said archive facility is countersigned once with an extremely long key.

29. The apparatus of claim 22, further comprising at least one of the following:

means for protecting said archive facility itself, rather than individual documents contained in said archive; and a cryptographic protection mechanism employed at said signature verification entity.

30. The apparatus of claim 22, further comprising:

a time stamp facility for sealing cryptographic information in time.

31. The apparatus of claim 22, further comprising:

either of a signature and a keyed hash algorithm for protecting non-cryptographic PKI state information from undetected modification, wherein said non-cryptographic PKI state information is maintained in an archive.

32. An apparatus for long term verification of digital signatures, comprising:

a source document; and a long term signature verification server for storing a public key infrastructure (PKI) state necessary to re-create a signature verification process at a later time relative to said document at a selected archival time, wherein classes of PKI state information may include:
one or more of certificate chain from one entity to another, including certification authorities (CAs) and the end entities; certificate revocation lists (CRLs), one for each CA in certificate chain; certificate practice statements; attribute certificates; policy constraints; trust information; and date and time;

wherein said archived PKI state in said long term signature verification server is used to precisely re-create said PKI state to execute exactly said signature verification process as it was or would have been performed earlier relative to said document at a selected time after a certificate associated with said signature has expired;

wherein the selected time over which a digital signature associated with said document can be verified is extended beyond expiration of any or all of any certificates upon which that signature depends; and wherein the time used as the basis for subsequent re-creation of a signature verification process is the time when said source document was signed by its originator.

33. The apparatus of claim 32, further comprising:

a facility for storing said source document separately from any associated cryptographic information.

34. The apparatus of claim 32, further comprising:

a secure storage facility in which said PKI state information is maintained to protect it from intrusion.

35. The apparatus of claim 34, wherein said secure storage facility comprises at least one of a firewall, access control mechanism, audit facility, intrusion detection facility, physical isolation, and network isolation.

36. The apparatus of claim 32, further comprising:

one or more utilities for any of viewing said PKI state information and visually monitoring system security.

37. The apparatus of claim 32, where in selected document related evidence is maintained in an archive.

38. The apparatus of claim 32, wherein all data in need of cryptographic refresh is periodically countersigned through the use of nested signatures.

39. The apparatus of claim 32, wherein information in said archive facility is countersigned once with an extremely long key.

40. The apparatus of claim 32, further comprising at least one of the following:

means for protecting said archive facility itself, rather than individual documents contained in said archive; and a cryptographic protection mechanism employed at said signature verification entity.

41. The apparatus of claim 32, further comprising:

a time stamp facility for sealing cryptographic information in time.

42. The apparatus of claim 32, further comprising:

either of a signature and a keyed hash algorithm for protecting non-cryptographic PKI state information from undetected modification, wherein said non-cryptographic PKI state information is maintained in an archive.

* * * * *